United States Patent Office 3,436,912
Patented Apr. 8, 1969

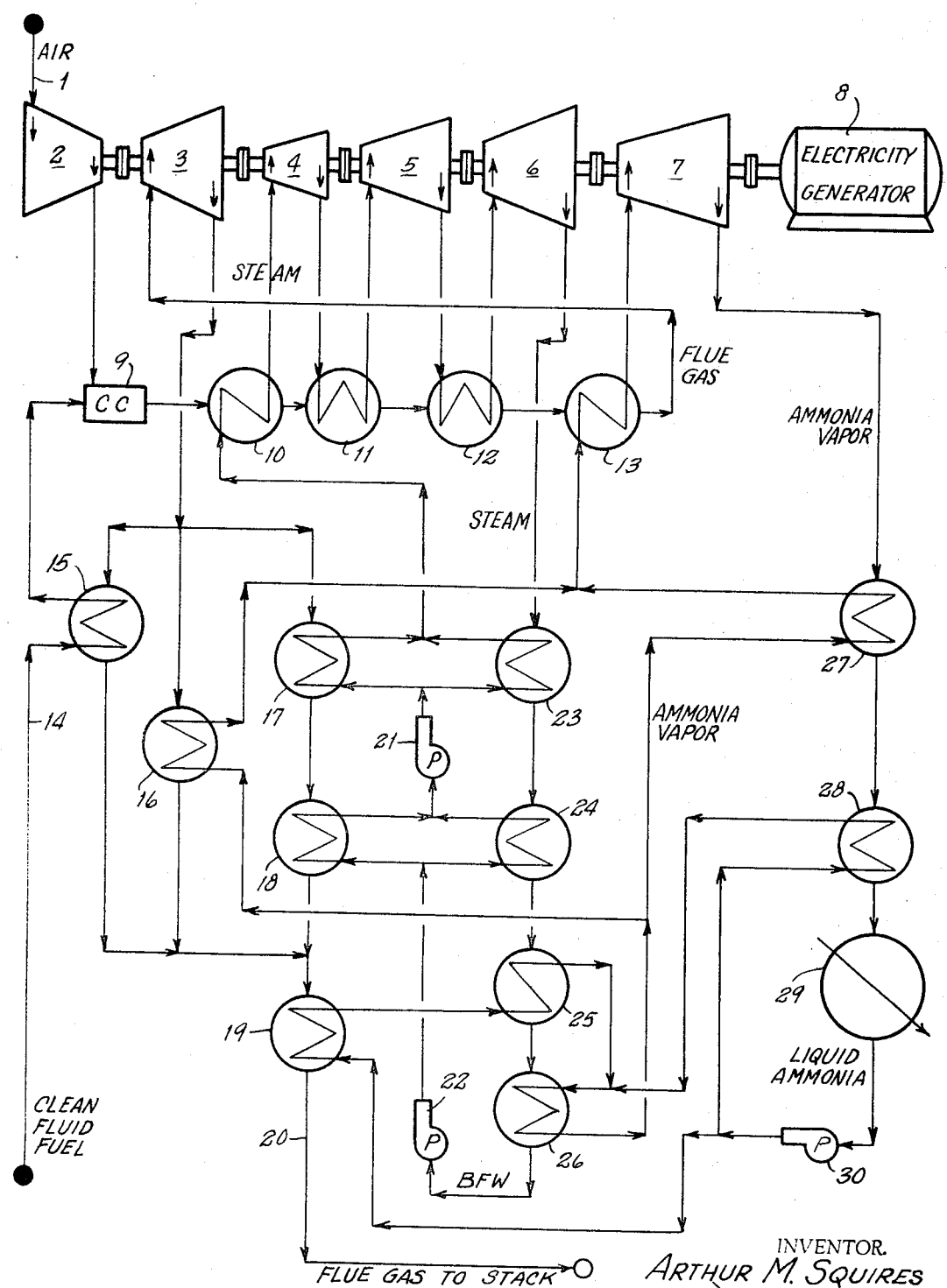

3,436,912
APPARATUS FOR COMBINED STEAM-AMMONIA CYCLE
Arthur M. Squires, 245 W. 104th St., New York, N.Y. 10025
Filed Jan. 4, 1967, Ser. No. 607,233
Int. Cl. F02c 3/22, 7/02; F01k 25/00
U.S. Cl. 60—39.18   8 Claims

ABSTRACT OF THE DISCLOSURE

There is provided a bottoming cycle in which a bottoming-fluid such as ammonia is vaporized with heat from condensing steam, and the vapor is heated to a high temperature, in part regeneratively, before it is expanded, cooled, and condensed against atmospheric cooling water or air. The new cycle is peculiarly suited to receive high-level heat generated by the combustion of a clean fluid fuel, the combustion being conducted at high pressure, and the combustion gases being cooled at least in part by heat exchange to bottoming-fluid vapor before the gases are discharged to the atmosphere.

Cross-references to related applications

This disclosure includes matter also disclosed in my co-pending application Serial No. 607,232, filed Jan. 4, 1967. The aforementioned co-pending application is a continuation-in-part of my co-pending application Ser. No. 380,005, filed July 2, 1964, now U.S. Patent 3,307,350 (Mar. 7, 1967).

Summary of the invention

This invention pertains to the production of power from readily available fuels such as heavy fuel oil, coal, or natural gas.

An object of the invention is to provide an improved bottoming cycle to receive heat from condensing steam.

Another object is to provide a bottoming cycle peculiarly adapted also to receive heat developed by the combustion of a clean fluid fuel at an elevated pressure.

Over one hundred years ago, Du Tremblay proposed that heat from condensing steam be used to boil a "bottoming-fluid" such as ammonia, to be used as the cycle fluid in a Rankine cycle rejecting heat to the environment—see U.S. Patent 6,929 (December 1849). The outstanding advantage of this idea is that the volumetric flow of the bottoming-fluid is small by comparison to the flow of steam from a low-temperature turbine which exhausts at a highly sub-atmospheric pressure. For the same turbine leaving loss, the exhaust flow area for ammonia is on the order of one percent of the flow area of a comparable steam turbine—see the discussion in American Power Conference, vol. 24 (1962), pp. 371–381. Incorporation of a bottoming cycle would permit the construction of power stations of greatly increased electricity-generating capacity without resort to cumbersome arrangements of multiple low-pressure steam exhausts. A disadvantage of an ammonia bottoming cycle is a reduction of the total power output per unit of steam flow. Another disadvantage is a loss of cycle efficiency. Until now, the disadvantages have seemingly outweighed the advantages, for bottoming cycles have not come into common use.

A "vapor regenerative" cycle is known—see J. Kenneth Salisbury, Steam Turbines and Their Cycles, John Wiley, 1950, p. 82—in which a fluid such as ammonia is vaporized at a temperature slightly higher than atmospheric, and the vapor is heated to a high temperature, in part regeneratively, before it is expanded. This cycle has a poor efficiency on account of a large intake of heat to vaporize the fluid at low temperature, and has not caught on.

I have been surprised to discover that the disadvantages of the bottoming cycle and of the vapor regenerative cycle are largely overcome if the two ideas are combined in a manner such that the heat of vaporization of the cycle fluid is supplied from condensing steam, while external heat is used primarily to supply heat to the cycle fluid at high temperature levels. With this arrangement, the size of the largest power station which can be built using a simple single-shaft turbine is greatly increased, and the arrangement is capable of affording an outstandingly good cycle efficiency.

According to my invention, there is provided an improved power cycle of the type in which a bottoming-fluid such as ammonia is boiled at an elevated pressure by heat exchange from condensing steam, the bottoming-fluid acting as the cycle fluid in a Rankine power cycle rejecting heat to the environment, the improvement comprising: adding first and second portions of heat to the bottoming-fluid vapor thereby raising its temperature to a high level, expanding the heated vapor in a power-developing expansion turbine, cooling the expanded vapor in a heat exchange to the bottoming-fluid vapor at the aforesaid elevated pressure thereby supplying at least a part of the first portion of heat, further cooling the expanded vapor in a heat exchange to liquiform bottoming-fluid, and condensing the cooled vapor.

The second portion of heat to the new bottoming cycle is advantageously provided by heat exchange from gases at a high pressure, preferably at least about 40 pounds per square inch absolute (p.s.i.a.), the gases having been generated by the combustion of a clean fluid fuel with compressed air. With this arrangement, th bottoming-fluid vapor is advantageously heated to at least about 1200° F., and an efficiency of conversion of the fuel energy to electricity can be achieved which is appreciably higher than that commonly obtained by present-day conventional Rankine-cycle steam power plant. I believe economic circumstances are commonly such as to justify the provision of ancillary plant in which "dirty" fuels, such as residual oil and coal, may be converted into a clean fluid fuel for use in the new power cycle. When the second portion of heat is provided from combustion gases at high pressure, the gases are advantageously expanded in a turbine, and then cooled, at least in part, by heat exchange to bottoming-fluid vapor thereby supplying a part of the aforementioned first portion of heat. This arrangement is permissible because, typically, the heat capacity of ammonia, for example, is appreciably higher at the aforementioned elevated pressure than at the pressure of the discharge of the bottoming-fluid turbine. The arrangement has the advantage that the "parent" steam cycle does not have to be degraded in efficiency by intake of the low-level heat transferred from the atmospheric-pressure combustion gases to the bottoming-fluid vapor.

The cycle of this invention is advantageously used in conjunction with steam power cycles of all types, and, viewed broadly, is particularly advantageous when used in conjunction with a parent steam power system in which air, or another oxygen-containing gas, is supplied to a combustion conducted at a high pressure. In such a system, the air or other oxygen-containing gas acquires heat by compression, and is not available to take up heat at low temperature levels from the exhaust flue gases. This low-level heat, if taken into cold boiler feed water, would degrade the steam cycle, and the fact that at least some of this heat can be absorbed by bottoming-fluid vapor is an advantage. A gas-turbine cycle incorporating a super-charged steam boiler is an example of such a power system, and advantageously lends itself to the adoption of the arrangement discussed in the preceding paragraph. Other examples of such a power system are: a gas-turbine plant which exhausts gases containing oxygen to a combustion taking place in an atmospheric-pressure steam boiler, and a magnetohydrodynamic electricity generator which axhausts combustion gases to a steam boiler—preferably a magnetohydrodynamic generator in which a clean fluid fuel is burned with oxygen or air enriched with oxygen, in accordance with the teachings of my co-pending application Ser. No. 582,883, filed Sept. 29, 1966, now U.S. Patent 3,324,654 (June 13, 1967).

The parent steam cycle may advantageously take the form of one of the several cycles described in my aforementioned co-pending application Ser. No. 607,232 filed Jan. 4, 1967, in which much more than the usual amount of reheat is provided to the expanding steam, so that the steam exhausts from a high-temperature expansion in a highly superheated condition, boiler feed water being heated in part by the cooling of the expanded steam. The expanding steam may be reheated both by indirect transfer of heat from combustion gases and by direct additions of combustion gases.

I prefer to use ammonia as the bottoming-fluid, but other substances such as sulfur dioxide, having good high-temperature stability toward materials of construction, will be satisfactory.

Brief description of the drawings

My invention including various novel features will be more fully understood by reference to the accompanying drawing, which diagrammatically illustrates an embodiment in which the parent steam cycle is a cycle in accordance with my aforementioned co-pending application Ser. No. 607,232, filed Jan. 4, 1967, having only indirect additions of heat to the steam.

Description of a preferred embodiment

The description of the drawing which follows provides both an understanding of the working of the apparatus indicated therein and also a numerical example, predicated upon the use of methane as fuel, the methane being available at a pressure higher than about 120 p.s.i.a.

Air enters the plant represented by the drawing via line 1 from the atmosphere, which is at 14.17 p.s.i.a. and 80° F. The air is compressed in compressor 2 to about 120.4 p.s.i.a., the rate of air flow being 4,431,556 pounds per hour (lbs./hr.). Methane is introduced via line 14 at a rate of 245,402 lbs./hr., and is heated in heat-exchanger 15 (against flue gases) to about 700° F. The compressed air and heated methane are burned in combustion-chamber 9, depicted as a rectangle containing the letters "CC," to form flue gases which are cooled in heat-exchangers 10 (against water and steam), 11 and 12 (against steam), and 13 (against ammonia vapor). The cooled gases enter expansion turbine 3 at 1500° F. and about 114.4 p.s.i.a. and discharge from turbine 3 at about 15 p.s.i.a. and about 847° F. The gases are then cooled, in part in heat-exchanger 15 (against methane), in part in heat-exchanger 16 (against ammonia vapor), and in part in heat-exchangers 17 and 18 (against water). The gases are further cooled in heat-exchanger 19 (against liquid ammonia). The cooled flue gases are discharged via line 20 and via a stack (not shown in the drawing) to the atmosphere at about 240° F.

Boiler feed water (BFW) at about 231.2° F., flowing at the rate of 1,801,600 lbs./hr., is pumped from about 21.26 p.s.i.a. to about 700 p.s.i.a. in pump 22, and the water is heated in heat-exchangers 18 and 24 (against flue gases and steam respectively) to a temperature between about 400° and 450° F. The BFW is then pumped to about 3,000 p.s.i.a. in pump 21, and is further heated in heat-exchangers 17 and 23 (against flue gases and steam respectively). The heated water is sent to heat-exchanger 10, where it is boiled and the resulting steam is superheated (against flue gases at about 120 p.s.i.a.). Steam is delivered from heat-exchanger 10 to the inlet of expansion turbine 4 at 2,400 p.s.i.a. and 1200° F., say, and is expanded in turbine 4 to about 580.8 p.s.i.a. Steam from turbine 4 is reheated to 1200° F. in heat-exchanger 11 (against flue gases) and is delivered to turbine 5 at about 522.8 p.s.i.a. and 1200° F. The steam is expanded in turbine 5 to about 126.5 p.s.i.a., and is again reheated in heat-exchanger 12 (against flue gases) to 1200° F. The steam from heat-exchanger 12 enters turbine 6 at about 113.9 p.s.i.a. and is expanded in this turbine to about 22.5 p.s.i.a., leaving the turbine at about 767° F. The low-pressure steam from turbine 6 is cooled in heat-exchangers 23 and 24 (against BFW) and in heat-exchanger 25 (against liquid ammonia) to its condensing temperature. Steam is condensed in heat-exchanger 26 (to liquid ammonia), and water from exchanger 26 is supplied to BFW pump 22.

Liquid ammonia at 100° F. and about 211.9 p.s.i.a. is pumped in pump 30 to about 1,015 p.s.i.a. at a rate of about 5,312,800 lbs./hr. The pumped ammonia is heated in part in heat-exchanger 28 (against ammonia vapor) and in part in heat-exchangers 19 and 25 (against flue gases and steam respectively). The heated liquid ammonia is supplied to heat-exchanger 26, where the ammonia is heated and boiled by the heat of condensing steam. Ammonia vapor at about 220° F. from heat-exchanger 26 is heated in greater part in heat-exchanger 27 (against ammonia vapor) and in lesser part in heat-exchanger 16 (against flue gases). The heated ammonia vapor is further heated in heat-exchanger 13 (against flue gases at high pressure), and the vapor enters expansion turbine 7 at 1200° F. and about 839.7 p.s.i.a. Vapor leaves turbine 7 at about 223.5 p.s.i.a., and the expanded vapor is cooled in heat-exchangers 27 and 28 (against ammonia vapor and liquid respectively) to about 120° F. The vapor is finally cooled and condensed by heat exchange to atmospheric cooling water in condenser 29, from which liquid ammonia is supplied to pump 30.

Turbines 3, 4, 5, 6, and 7 furnish power to drive air compressor 2 and electricity generator 8. The respective turbines, the compressor, and the generator are depicted in the drawing as being linked via a common shaft. Often there is advantage in operating some of the equipment at one speed and some at another, or in driving the air compressor by means of its own separate driving turbine, or in providing certain of the machines in the form of two units acting in parallel. Any of these arrangements may be used within the scope of this invention, and it will therefore be appreciated that the arrangement depicted in the drawing is highly schematic.

This example, under typical conditions of atmospheric cooling water availability, at typical generator mechanical efficiency, and at typical requirements for auxiliary power needed within the power station, can send out electricity at a rate of about 696,781 kilowatts. At this rate the fuel requirement per kilowatt-hour of electricity sent out—the "heat rate"—is about 8,404.8 British thermal units per kilowatt-hour (B.t.u./kw. h.), reckoned on the higher heating value basis. A conventional plant using present-day technology (burning methane at atmospheric pressure, supplying steam to a turbine at 2,400 p.s.i.a. and 1000° F., employing one reheat to 1000° F., and exhausting at 100° F.) would provide a heat rate not less than about 9,450 B.t.u./kw. h., and would require a flow of steam not less than about 150 percent greater than the steam flow of the foregoing example of the invention. The outstanding advantage of the invention is apparent.

Other clean gaseous or liquid fuels besides methane may be used in the cycle of my invention, and there is particular advantage in using a clean fluid fuel such as may be derived from residual oils or coals by means of gasification, cracking, carbonization, hydrogasification, hydrocracking, and hydrocarbonization processes and by sulfur- and dust-removal processes. Waste heat thrown off from these processes may often be advantageously used to heat BFW, to raise steam, to heat steam, and to heat bottoming-fluid, thereby reducing the duties of the exchangers which are provided in the drawing for these respective purposes.

Exchangers 10, 11, 12, and 13 may be replaced by equivalent exchangers receiving heat from flue gases at about atmospheric pressure, the gases being derived from a magneto-hydrodynamic electricity generator or from a combustion to which combustion oxygen is supplied in form of the effluent from a gas turbine. The atmospheric-pressure flue gases would pass from the exchanger substituted for exchanger 13 directly to exchangers 15, 16, and 17, turbine 3 being omitted.

I do not wish my invention to be limited to the particular embodiments described. Those skilled in the art recognize other arrangements and other applications of the invention which will differ from my example only in detail, not in spirit.

I claim:
1. In apparatus for generating power of the type which includes a heat exchanger for condensing steam and for heating liquiform bottoming-fluid such as ammonia to form a vapor at an elevated pressure, an expansion turbine for expanding said vapor and developing power, a condenser to receive the exhaust from said expansion turbine, and a pump to pressurize liquiform bottoming-fluid the improvement comprising:
   (a) one or more heat exchangers for heating said vapor at said elevated pressure,
   (b) combustion means for burning a fuel with a gas containing oxygen to form combustion products,
   (c) a heat exchanger, additional to said one or more exchangers of (a), for further heating said vapor at said elevated pressure and for cooling said combustion products,
   (d) a connection to lead said further heated vapor from said additional heat exchanger of (c) to said turbine for expanding bottoming-fluid vapor,
   (e) one or more heat exchangers for cooling said exhaust from said expansion turbine ahead of said condenser,
   (f) a gas compressor suitable to provide a discharge at a pressure of at least about 40 p.s.i.a.,
   (g) means for conducting at least a major portion of said gas to the inlet of said gas compressor,
   (h) means for utilizing said discharge to support combustion, said means including said combustion means for burning said fuel with said gas containing oxygen, and
   (i) one or more heat exchangers for further cooling said combustion products.

2. Apparatus of claim 1 in which also said combustion products are at a pressure of at least about 40 p.s.i.a. in said additional heat exchanger of (c) for further heating said vapor.

3. Apparatus of claim 2 in which also said gas containing oxygen is atmospheric air.

4. Apparatus of claim 1 in which also said fuel is a fluid fuel substantially free of sulfur and particulate matter.

5. In apparatus for generating power of the type which includes a heat exchanger for condensing steam and for heating liquiform bottoming-fluid such as ammonia to form a vapor at an elevated pressure, an expansion turbine for expanding said vapor and developing power, a condenser to receive the exhaust from said expansion turbine, and a pump to pressurize liquiform bottoming-fluid, the improvement comprising:
   (a) a pump to pressurize boiler feed water,
   (b) a generator of steam at high pressure,
   (c) a series of expansion turbine stages for expanding said steam to a terminal pressure and developing power, substantially all of the exhaust from each nonterminal stage constituting the flow entering the next stage of said series,
   (d) means for adding heat to said steam at one or more pressures intermediate between said high pressure and said terminal pressure,
   (e) one or more heat exchangers for cooling the exhaust from the terminal stage of said series,
   (f) a connection to lead said cooled exhaust to said heat exchanger for condensing steam,
   (g) one or more heat exchangers for heating said vapor of said bottoming-fluid at said elevated pressure,
   (h) combustion means for burning a fuel with a gas containing oxygen to form combustion products,
   (i) a heat exchanger, additional to said one or more exchangers of (g), for further heating said vapor at said elevated pressure and for cooling said combustion products,
   (j) a connection to lead said further heated vapor from said additional heat exchanger of (i) to said turbine for expanding bottoming-fluid vapor,
   (k) one or more heat exchangers for cooling said exhaust from said turbine ahead of said condenser,
   (l) a gas compressor suitable to provide a discharge at a pressure of at least about 40 p.s.i.a.,
   (m) means for conducting at least a major portion of said gas to the inlet of said gas compressor,
   (n) means for utilizing said discharge to support combustion, said means including said combustion means for burning said fuel with said gas containing oxygen, and
   (o) one or more heat exchangers for further cooling said combustion products.

6. Apparatus of claim 5 in which also said combustion products are at a pressure of at least about 40 p.s.i.a. in said additional heat exchanger of (i) for further heating said vapor.

7. Apparatus of claim 6 in which also said gas containing oxygen is air.

8. Apparatus of claim 6 including also an expansion turbine developing power and for expanding said cooled combustion products from said additional heat exchanger of (i) for further heating said vapor.

References Cited

UNITED STATES PATENTS

| 427,398 | 5/1890 | Campbell | 60—36 |
| 439,259 | 10/1890 | Tellier | 60—36 |
| 1,993,585 | 3/1935 | Beaumann et al. | |
| 3,164,958 | 1/1965 | Pacault. | |
| 3,325,992 | 6/1967 | Sheldon. | |

JULIUS E. WEST, *Primary Examiner.*

U.S. Cl. X.R.

60—49, 73